(12) United States Patent
Camp

(10) Patent No.: US 10,982,338 B2
(45) Date of Patent: Apr. 20, 2021

(54) ELECTRONIC CORROSION PROTECTION DEVICE

(71) Applicant: Warren Camp, North Fort Myers, FL (US)

(72) Inventor: Warren Camp, North Fort Myers, FL (US)

(73) Assignee: Auto Saver Systems, Inc., Colonie, NY (US)

( * ) Notice: Subject to any disclaimer, the term of this patent is extended or adjusted under 35 U.S.C. 154(b) by 491 days.

(21) Appl. No.: 15/573,479

(22) PCT Filed: May 20, 2016

(86) PCT No.: PCT/US2016/033441
§ 371 (c)(1),
(2) Date: Nov. 12, 2017

(87) PCT Pub. No.: WO2016/191252
PCT Pub. Date: Dec. 1, 2016

(65) Prior Publication Data
US 2018/0119290 A1    May 3, 2018

Related U.S. Application Data

(60) Provisional application No. 62/166,002, filed on May 24, 2015.

(51) Int. Cl.
| C23F 13/06 | (2006.01) |
| B60K 37/00 | (2006.01) |
| C23F 13/22 | (2006.01) |
| G01N 17/02 | (2006.01) |
| B60R 16/023 | (2006.01) |
| B60R 16/03 | (2006.01) |

(52) U.S. Cl.
CPC .............. *C23F 13/06* (2013.01); *B60K 37/00* (2013.01); *B60R 16/023* (2013.01); *B60R 16/03* (2013.01); *C23F 13/22* (2013.01); *G01N 17/02* (2013.01); *B60Y 2410/115* (2013.01); *C23F 2201/00* (2013.01); *C23F 2213/30* (2013.01)

(58) Field of Classification Search
CPC ...... C23F 13/06; C23F 13/22; C23F 2201/00; C23F 2213/30; B60K 37/00; B60R 16/023; B60R 16/03; G01N 17/02; B60Y 2410/115
See application file for complete search history.

(56) References Cited

U.S. PATENT DOCUMENTS

| 5,407,549 A * | 4/1995 | Camp | C23F 13/02 204/196.05 |
| 2009/0166219 A1* | 7/2009 | Richardson | C23F 13/04 205/729 |
| 2009/0203247 A1* | 8/2009 | Fifelski | H01R 13/6273 439/345 |

* cited by examiner

*Primary Examiner* — Ciel P Contreras
(74) *Attorney, Agent, or Firm* — Gowling WLG (Canada) LLP; Kevin O'Neill

(57) ABSTRACT

A electronic corrosion protection (ECP) device includes a physical interface for connecting to an on-board diagnostic port of a vehicle. The ECP device can be easily and safely installed in a vehicle and provide corrosion protection to metal components of the vehicle.

8 Claims, 4 Drawing Sheets

ELECTRONIC CORROSION PROTECTION DEVICE

CROSS REFERENCE TO RELATED APPLICATION

The current application is a National Stage Application of PCT application PCT/US2016/033441 filed 20 May 2016, which claims priority to U.S. Provisional Patent Application Ser. No. 62/166,002 filed May 24, 2015, which is are incorporated in its their entirety by reference herein.

TECHNICAL FIELD

The current disclosure relates to corrosion protection for metal and in particular to electronic corrosion protection.

BACKGROUND

Vehicle On Board Diagnostic ("OBD") interfaces are standardized by statute on all modern vehicles. These interfaces conform to both physical and protocol specifications. The communication protocols used by OBD include serial (e.g.: RS-232) and controller area network (CAN). There are at least 5 different standards based protocol specifications in use for current OBD systems, including SAE J1850 PWM/VPW, ISO 9141-2, ISO 14230 KWP2000, and ISO 15765 CAN. Starting in 2008, all US vehicles must use ISO 15765 CAN based communication protocols for the OBD interface. Various standards are known for OBD, such as OBD-I, OBD 1.5, and OBD-II which include various standard interfaces, signal protocols, data communications, etc.

Electronic corrosion protection (ECP) devices have become a viable and popular alternative to traditional chemical spray coating as a means of protecting automobiles from corrosion. ECP devices function by inducing an electrical current into the metal structures of the automobile. ECP devices are typically connected directly to the automobile's 12V battery as well as to a metal surface of the vehicle. ECP devices are typically located in the engine compartment in order to facilitate connecting the ECP device to the battery and the metal surface, which could be a metal part of the vehicle's chassis.

BRIEF DESCRIPTION OF THE DRAWINGS

Embodiments are described herein with reference to the appended drawings, in which.

DETAILED DESCRIPTION

Figure 1:
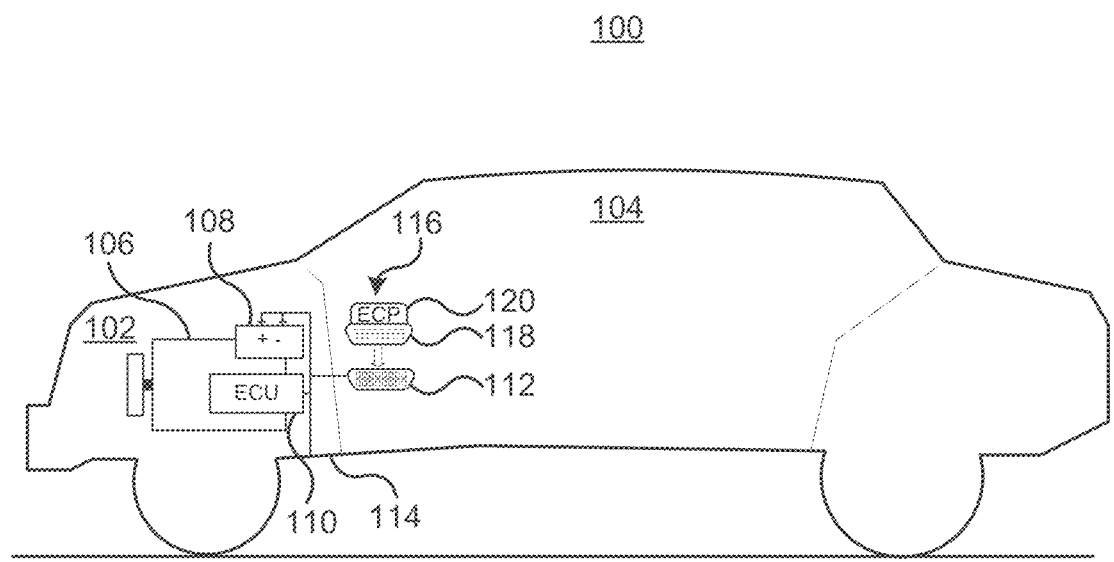
FIG. 1 depicts a vehicle incorporating an electronic corrosion protection device.

In accordance with the present disclosure there is provided an electronic corrosion protection device for use in an automobile comprising: a physical interface for connecting to an in-vehicle port, the physical interface comprising: a VDC connection for connecting the electronic corrosion protection device to a direct current (DC) voltage connection of the diagnostic port; a GND connection for connecting the electronic corrosion protection device to a signal ground connection of the diagnostic port; and a CHASSIS connection for connecting the electronic corrosion protection device to a chassis ground connection of the diagnostic port; and an electronic corrosion protection module comprising: a power component coupled to the VDC connection and the GND connection; and corrosion protection circuitry coupled to the power component and to the CHASSIS connection, the corrosion protection circuitry for generating and outputting an electronic corrosion protection signal to the CHASSIS connection.

In accordance with a further embodiment of the electronic corrosion protection device, the diagnostic port of the vehicle is an on-board diagnostic port coupled to a positive terminal of a battery, a negative terminal of a battery and a metal portion of the vehicle, wherein the VDC connection is for connecting to the positive terminal, the GND connection is for coupling to the negative terminal and the CHASSIS connection is for coupling to the metal portion.

In accordance with a further embodiment of the electronic corrosion protection device, the physical interface is removably coupled to the electronic corrosion protection module.

In accordance with a further embodiment of the electronic corrosion protection device, the physical interface is permanently connected to the electronic corrosion protection module.

In accordance with a further embodiment of the electronic corrosion protection device, the physical interface and the electronic corrosion protection module are housed within a single housing.

In accordance with a further embodiment of the electronic corrosion protection device, the physical interface and the electronic corrosion protection module are each housed within a respective housing.

In accordance with a further embodiment of the electronic corrosion protection device, the physical interface comprises a shape allowing connection to the in-vehicle port in a single orientation.

In accordance with a further embodiment of the electronic corrosion protection device, the physical interface comprises a D-shaped connector.

In accordance with a further embodiment of the electronic corrosion protection device, the physical interface comprises electrical connections to at least 3 of 16 pins of the in-vehicle port.

In accordance with a further embodiment of the electronic corrosion protection device, the physical interface comprises a ODB II compliant interface connector.

In accordance with a further embodiment, the electronic corrosion protection device further comprises a second physical interface corresponding to the in-vehicle port allowing connection of additional devices to the in-vehicle port through the electronic corrosion protection device.

Electronic corrosion protection (ECP) devices prevent or at least inhibit rust formation on metal parts and have been shown to be effective in vehicles. In vehicles, ECP devices have been mounted by connecting the ECP device to positive and negative terminals of the vehicle's battery. The battery is typically located in the engine compartment, or possibly in the trunk of the vehicle. In addition to the battery terminals, the ECP device is also connected to metal components of the vehicle that are to be protected from corrosion. For metal components connected together, only a single point of contact is required. For example, the ECP device may be connected to a metal chassis of the vehicle. In one type of ECP device, the entire chassis of the vehicle may serve as a negative ground or return path to the negative pole of the battery. The electrons flowing back to ground through the metal of the chassis may create a cathodic effect in those parts of the metal that are exposed to humidity, and this effect is what inhibits corrosion in the exposed metal. While the cathodic effect described above may be used to provide electronic corrosion protection, other electronic techniques, including application of high frequency signals, capacitive charging or other techniques may be employed by ECP devices. Regardless of the specific technique used to protect from corrosion, ECP devices will typically be connected to a vehicles metal structure as well as its battery.

While installing the ECP device within the engine compartment, or trunk, of the vehicle provides acceptable corrosion protection, the installation may be problematic. A technician, or possibly a user, may need to disconnect the battery from the vehicle systems in order to properly attach the ECP device to the battery. Besides the work required to disconnect the battery, attach the ECP device and re-connect the battery, the disconnection may have other undesirable effects such as resetting certain electrical systems such as clocks, radios, navigation systems, memory systems, etc. Additionally, the installation process has the potential to incorrectly attach the ECP device to the battery, or re-connect the battery incorrectly, which may result in malfunctioning of the electronic components, or possibly damage the electronic components or other components of the vehicle. For example, vehicle fires may be possible if ECP devices are connected incorrectly to the vehicle's battery. Further, installing the ECP device, or the connecting cables, close to moving parts, or hot surfaces can result in damage, melting and possible short-circuiting of the ECP device as well as possibly the battery and other electronics. As described further herein, an ECP device may be provided with a physical interface that connects to an on-board diagnostic port of the vehicle. Such a connection can be located within the passenger compartment away from moving parts and hot surfaces. The on-board diagnostic port may include various electrical connections to electrical components and systems of the vehicle including connections to the battery as well as the vehicle's chassis. Further, the physical interface may have a single orientation for connecting to the on-board diagnostic port ensuring that the ECP device is properly connected to the battery and chassis. The ECP device described further bellow is easy and safe to install. Since the ECP device may be installed by simply connecting the ECP device to an existing on-board diagnostic port of the vehicle, it provides a convenient means for protecting the vehicle from corrosion, while eliminating the need to install the ECP device in a vehicle's engine compartment where the harshness of the environment and moving parts create hazards, especially where the ECP device may be improperly installed or its wiring may come into contact with hot or moving parts located within the vehicle's engine compartment.

An on-board diagnostic (OBD) corrosion protection connector may comprise an OBD male adaptor that is wired to connect to the number 4, 5 and 16 pins of a female OBD II port connector. The number 4 pin in the OBD II port connector is a chassis ground connection. The Number 5 pin in the OBD II port connector is a signal ground connection, or negative terminal of the vehicle's 12V battery. The Number 16 pin in the OBD II port connector is a battery power connection or the positive terminal of the 12V battery. Connecting the ECP device to the OBD II port connector using the OBD male adapter comprising electrical terminals, wired to connect to the Number 4, 5 and 16 pins of the OBD II connector, achieves the same connection to the battery and vehicle metal contemplated by the traditional installation in the engine compartment. The OBD male adaptor of the ECP device may only provide connections to the OBD II port connector that are connected to the battery terminals and the vehicle's chassis. The other connections may be provided as dummy connections or omitted entirely.

The OBD corrosion protection connector, or the ECP module, may also provide a power supply output module to provide appropriate power to the ECP. In this way, by means of the connection of the OBD corrosion protection connector and the vehicle OBD connector, the appropriate power, which may be direct current (DC) is provided to the ECP, and the ECP device is also connected to the chassis ground.

The OBD II port connector of the vehicle is wired to an electronics bus over which vehicle sensors, vehicle control electronics and other electronics in the vehicle communicate. The vehicle sensors and the vehicle control electronics receive power from the vehicle's battery, which is wired to the OBD II port connector. These conductors contact corresponding power conductors on the OBD connector of the OBD corrosion protection connector to transfer power from the battery to the OBD corrosion protection connector. In this way, by means of the connection of the OBD corrosion protection connector and the vehicle OBD connector, the direct current (DC) power is output to the electric corrosion protection device (ECP). Therefore, the ECP is connected to a DC voltage source, even when the vehicle is turned off, via the OBD corrosion protection connector device, and the ECP is also connected to the chassis ground.

The OBD corrosion protection connector may be physically incorporated into the ECP device. The first side of the OBD corrosion protection connector is adapted with a power supply output module wired to be physically attached to the corresponding internal electric terminals of the ECP device. The second side of the OBD corrosion protection connector is adapted with an OBD mating connector to be wired to the vehicle's OBD mating connector. In this way, by means of a self-contained ECP OBD corrosion protection connector, the DC current from the battery is output to the ECP. Therefore, the ECP device is able to be directly plugged into the vehicle's OBD mating connector.

The OBD corrosion protection connector device may also be fitted with a port to allow a second device, such as a telematic device to be installed at the same time as the ECP device.

The vehicle may include any vehicle having an OBD connector including, but not limited to a car, pick-up, SUV, van, bus, motorcycle, motor-home, semi-tractor, delivery truck, or construction vehicle.

The present invention further provides a new device for the installation of an ECP device into a vehicle's OBD port located in the vehicle, in particular, the passenger compartment, thereby making such an installation environmentally safe to the consuming public.

FIG. 1 depicts a vehicle incorporating an electronic corrosion protection device. A vehicle 100 comprises an engine compartment 102 that is separated from a passenger compartment 104, typically by a firewall. The engine compartment 102 encloses the vehicle's engine 106, battery 108 and electronic control unit (ECU) 110. It will be appreciated that the vehicle 100 is intended only as a basic representation and the particular vehicle components as well as their specific locations may vary. The ECU 110, as well as other electronics of the vehicle may be communicatively coupled together by a communication bus. One example of such a bus is a controller area network (CAN) bus.

An on-board diagnostic (OBD) port 112 may be provided within the passenger compartment 104 of the vehicle. The OBD port 112 provides a physical interface that allows devices, such as diagnostic and telemetry devices to be connected to the CAN bus of the vehicle and so communicate with electronic components of the vehicle, which can facilitate diagnostics and other procedures such as tuning a vehicle's performance. The OBD port 112 is connected to the battery 108, which can supply power to devices connected to the OBD port 112. Further the OBD port 112 includes a connection to a vehicle's chassis 114. The OBD port 112 may have different physical shapes; however it is commonly defined by the OBD II specification, which defines standardized hardware interfaces and pin connections as well as the electrical signalling protocols and message formatting.

An electronic corrosion protection (ECP) device 116 may be connected to the ODB port 112, which provides power connections as well as a connection to the vehicle's metal chassis 114. The ECP device 116 comprises an OBD connector 118 that provides a physical connection to the OBD port 112. The OBD connector 118 provides a connection between the OBD port 112 and an ECP module 120 that provides the electronic corrosion protection. The ECP module 120 generates a corrosion protection signal to induce an electrical current into the metal structures of the vehicle through the chassis 114 connected to the OBD port 112. The OBD port 112 provides standardized pin connections to the various electrical components. Accordingly, the ECP device 116 can be connected to the battery, signal ground and chassis ground through an OBD connector 118.

Figure 2:
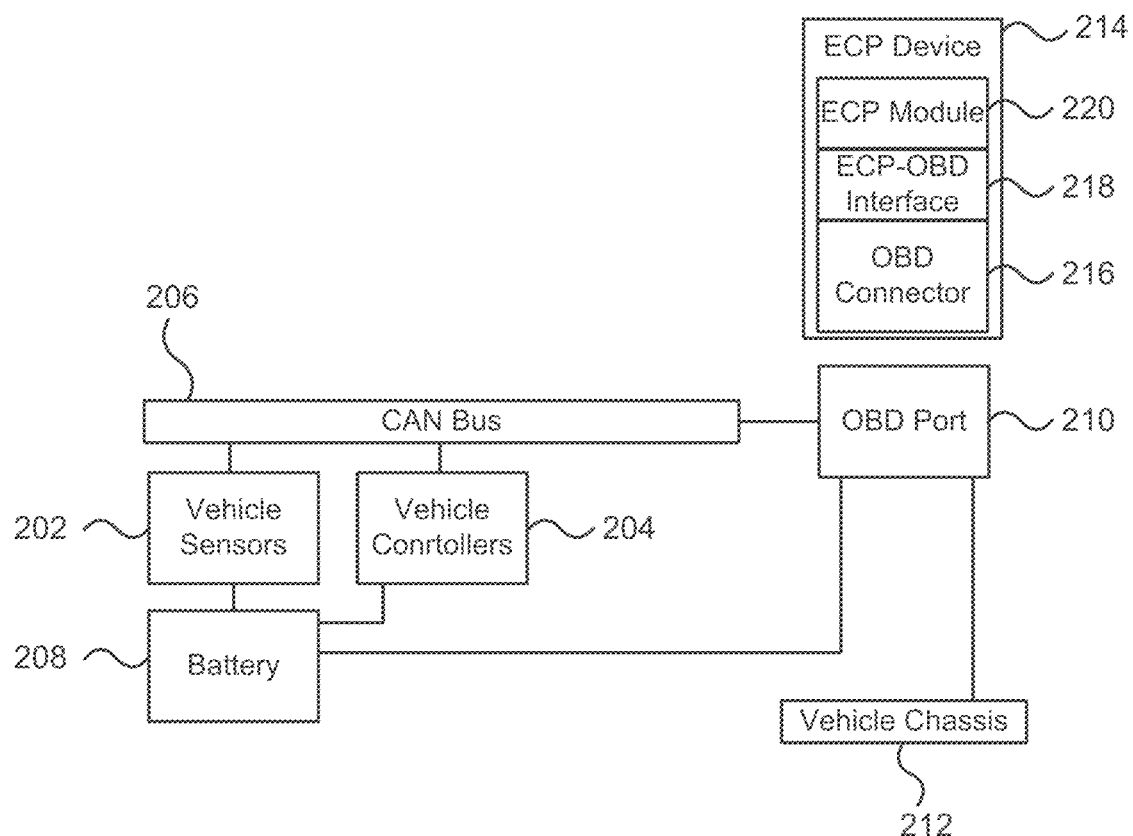
FIG. 2 depicts a schematic of components of the vehicle of FIG. 1.

FIG. 2 depicts a schematic of components of the vehicle of FIG. 1. The vehicle comprises a plurality of vehicle sensors 202 and vehicle controllers 204 that can communicate with each other, and other components. The sensors 202 and controllers 204 may be connected to a CAN bus 206, or other communication bus, for providing communication between the components. The CAN bus provides a communication standard allowing components to communicate in a coordinated manner. The sensors 202 and controllers 204 may be connected to a vehicle's battery 208. The vehicle may include one or more ODB port connectors 210, including an OBD port connector 210 located in the vehicle's passenger compartment. The OBD port 210 provides a physical interface to the CAN bus 206, battery 208 and vehicle chassis 212.

An ECP device 214 may be connected to the vehicle's battery 208 and chassis 212 through the OBD port 210. The ECP device 214 may comprise an OBD connector 216 that provides a physical connection to the OBD port 210. An ECP to OBD interface 218 may connect the physical OBD connector 216 to an ECP module 220. The ECP-OBD interface 218 may simply comprise a wire connection between specific pins of the OBD connector 216 to the ECP module 220. The ECP module 220 generates a corrosion protection signal that induces an electrical current into the metal structures of the vehicle through the chassis 212 connected to the OBD port 210. Although the OBD port 210, and corresponding OBD connector 216 of the ECP device 214, may conform to a number of different standards, it is assumed that the OBD port 210 conforms to the OBD II standard.

Figure 3A:
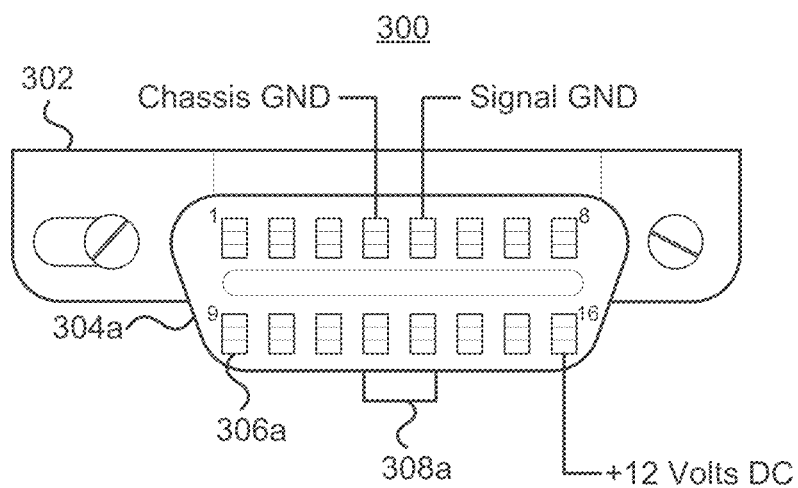
FIG. 3A depicts an on board diagnostic port for a vehicle, such as the vehicle of FIG. 1.

FIG. 3A depicts an on board diagnostic port for a vehicle, such as the vehicle of FIG. 1. The OBD port 300 may be installed within a vehicle's passenger compartment. The OBD port 300 may comprise a mounting structure 302 for securing the OBD port 300 to the vehicle. The OBD port 300 may include a physical connector 304a that includes physical structure and electrical connectors 306a. The electrical connectors may be assigned numbers in order to simplify identification of the various connectors. The number 1 pin of the connectors is at the top left in FIG. 3A, with the pin numbers increasing along the top row and continuing to the bottom row of connectors 306a with the number 16 pin located at the bottom right in FIG. 3A. The OBD port 300 may include a lock or securing mechanism 308a that provides a secure physical and electrical connection between components. It will be appreciated that the various pin connectors 306a may be connected to various electrical components. Of particular relevance to the ECP device, the OBD port includes a chassis ground connection at pin number 4, a signal ground connection at pin number 5 and a positive DC voltage connection at pin connection 16.

Figure 3B:
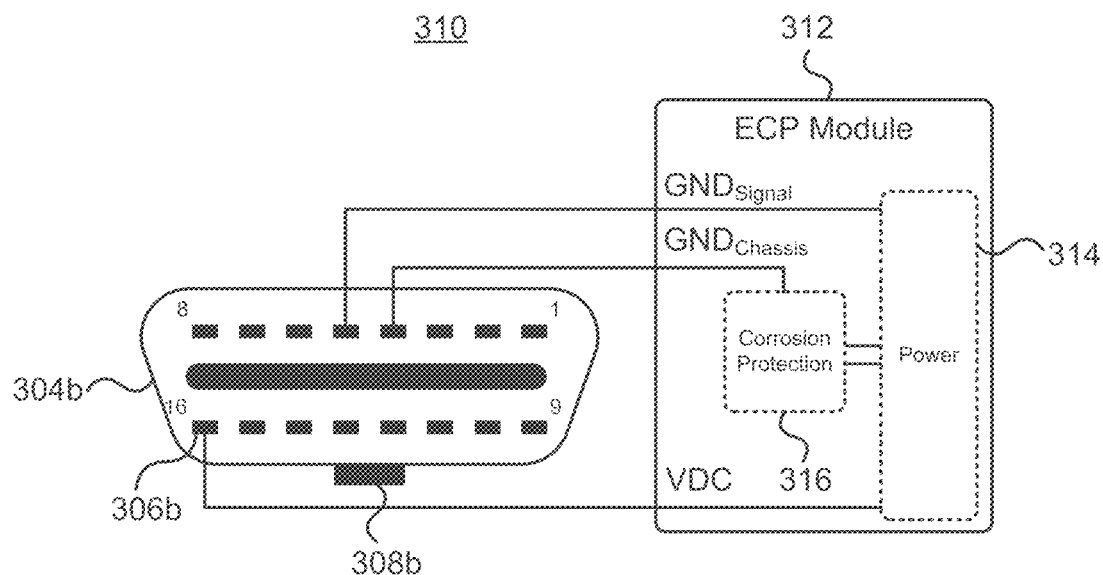
FIG. 3B depicts an electronic corrosion protection device for use with the on board diagnostic port of FIG. 3A.

FIG. 3B depicts an electronic corrosion protection device for use with the on board diagnostic port of FIG. 3A. As depicted, the ECP device 310 comprises a matching physical connector 304b that includes corresponding electrical connections 306b that form electrical connections with the corresponding connectors 306a of the OBD port 300 when connected. A locking or aligning portion 308b can mate with the corresponding structure 308a to secure the connection. It is noted that the pin numbers are reversed in the OBD connector 304b of the ECP device 310 in FIG. 3B. The OBD connector 304b is connected to an ECP module 312. In particular, the signal ground and positive voltage signal connectors of OBD pin number 5 and 16 respectively, are connected to a power component 314 of the ECP module. The power component 314 may output an appropriate power signal to corrosion protection circuitry 316. As an example, the power component may receive a 12V DC signal and output a different voltage, possibly higher or lower, to the corrosion protection circuitry 316. Alternatively, if the corrosion protection circuitry 316 operates on 12V, the power component 314 may simply by a wired connection, or similar simple circuitry. The corrosion protection circuitry 316 generates the corrosion protection signal and outputs the signal to pin number 4 of the OBD connector that is connected to the vehicle's chassis. The corrosion protection signal may be generated in various ways depending upon the type of electronic corrosion protection provided by the ECP device. Regardless of the specific corrosion protection signal generated, it can be supplied to the OBD connector and so the vehicle's chassis and connected metal components.

Figure 4A:
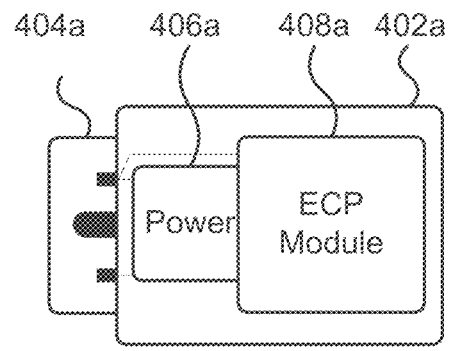
FIG. 4A depicts a physical implementation of the ECP device.

FIG. 4A depicts a physical implementation of the ECP device. As described above, an ECP device may be connected to the vehicle through the OBD port within the vehicle's passenger compartment. The ECP device 400a comprises a single physical housing 402a that includes the OBD connector 404a, a power component 406a and an ECP 408a. The OBD connector 404a connects the power component 406a and the ECP 408a to the battery connections and chassis connection of the vehicle through the connections of the OBD port.

Figure 4B:
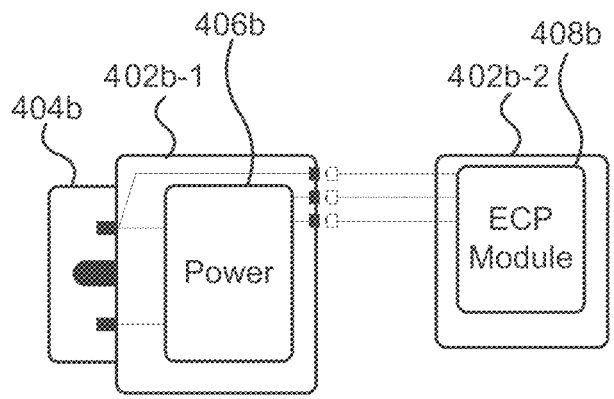
FIG. 4B depicts a further physical implementation of the ECP device.

FIG. 4B depicts a further physical implementation of the ECP device. The ECP device 400b is similar to the ECP device 400a described above. However rather than a single physical housing 402a described above, the ECP device 400b comprises two separate houses 402b-1, 402b-2 that are connected to each other by wires, cables or other electrical connectors. The ECP device 400*b* comprises a first housing 402*b*-1 that comprises the OBD connector 404*b* and a power component 406*b*. The power component 406*b* provides power to a second housing 402*b*-2 that comprises the ECP module 408*b*. The ECP device 400*b* may allow mounting the ECP component away from the OBD port connection 404*b* which may be desirable in certain applications.

Figure 4C:
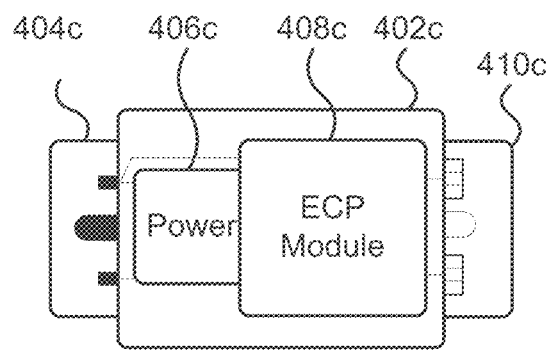
FIG. 4C depicts a further physical implementation of the ECP device.

FIG. 4C depicts a further physical implementation of the ECP device. The ECP device 400*c* is similar to the ECP device 400*a* and comprises a single physical housing 402*c* that includes the OBD connector 404*c*, a power component 406*c* and an ECP 408*c*. The OBD connector 404*c* connects the power component 406*c* and the ECP 408*c* to the battery connections and chassis connection of the vehicle through the connections of the OBD port. The ECP device 400*c* further comprises an OBD port connector 410*c* that provides a pass-through connection for connecting other OBD devices.

One or more illustrative embodiments have been described by way of example. It will be understood to persons skilled in the art that a number of variations and modifications can be made without departing from the scope of the invention as defined in the claims.

What is claimed is:

1. An electronic corrosion protection device for use in an automobile comprising:
 a single housing enclosing:
  a physical interface for connecting to an in-vehicle diagnostic port, the physical interface comprising:
   a VDC connection for connecting the electronic corrosion protection device to a direct current (DC) voltage connection of the diagnostic port;
   a GND connection for connecting the electronic corrosion protection device to a signal ground connection of the diagnostic port; and
   a CHASSIS connection for connecting the electronic corrosion protection device to a chassis ground connection of the diagnostic port, the chassis ground connection of the diagnostic port providing a direct electrical connection to the vehicle chassis; and
  an electronic corrosion protection module comprising:
   a power component coupled to the VDC connection and the GND connection; and
   corrosion protection circuitry coupled to the power component and to the CHASSIS connection, the corrosion protection circuitry for generating and outputting an electronic corrosion protection signal to the CHASSIS connection.

2. The electronic corrosion protection device of claim 1, wherein the diagnostic port of the vehicle is an on-board diagnostic port coupled to a positive terminal of a battery, a negative terminal of a battery and a metal portion of the automobile, wherein the VDC connection is for connecting to the positive terminal, the GND connection is for coupling to the negative terminal and the CHASSIS connection is for coupling to the metal portion.

3. The electronic corrosion protection device of claim 1, wherein the physical interface comprises a shape allowing connection to the in-vehicle port in a single orientation.

4. The electronic corrosion protection device of claim 3, wherein the physical interface comprises a D-shaped connector.

5. The electronic corrosion protection device of claim 4, wherein the physical interface comprises electrical connections to at least 3 of 16 pins of the in-vehicle port.

6. The electronic corrosion protection device of claim 1, wherein the physical interface comprises a ODB II compliant interface connector.

7. The electronic corrosion protection device of claim 1, further comprising a second physical interface corresponding to the in-vehicle port allowing connection of additional devices to the in-vehicle port through the electronic corrosion protection device.

8. The electronic corrosion protection device of claim 1, wherein the in-vehicle diagnostic port is located within a passenger compartment.

\* \* \* \* \*